US007937850B2

(12) United States Patent
Tate et al.

(10) Patent No.: US 7,937,850 B2
(45) Date of Patent: May 10, 2011

(54) METHODS AND APPARATUS FOR DRYING CONDENSED DISTILLER'S SOLUBLES (CDS) TO PRODUCE DRIED DISTILLER'S SOLUBLES (DDS)

(75) Inventors: Jeffrey L. Tate, North Port, FL (US); James A. Rehkopf, San Rafael, CA (US); David A. Mirko, Payson, AZ (US)

(73) Assignee: J. Jireh Holdings LLC, Payson, AZ (US)

( * ) Notice: Subject to any disclaimer, the term of this patent is extended or adjusted under 35 U.S.C. 154(b) by 324 days.

(21) Appl. No.: 12/398,984

(22) Filed: Mar. 5, 2009

(65) Prior Publication Data
US 2009/0269477 A1 Oct. 29, 2009

Related U.S. Application Data

(63) Continuation-in-part of application No. 12/215,214, filed on Jun. 25, 2008.

(60) Provisional application No. 61/068,191, filed on Mar. 5, 2008, provisional application No. 60/937,073, filed on Jun. 25, 2007.

(51) Int. Cl.
*F26B 17/00* (2006.01)
*F26B 23/02* (2006.01)
*C12P 7/06* (2006.01)
*A23L 1/236* (2006.01)
*A23K 1/06* (2006.01)

(52) U.S. Cl. ......... 34/191; 34/365; 34/579; 252/182.27; 426/548; 426/656; 432/14; 432/58; 435/161

(58) Field of Classification Search ................. None
See application file for complete search history.

(56) References Cited

U.S. PATENT DOCUMENTS

| 3,994,671 | A | 11/1976 | Straitz, III |
| 4,128,389 | A | 12/1978 | Straitz, III |
| 4,667,654 | A | 5/1987 | Thaler et al. |
| 5,209,821 | A | 5/1993 | Shaw et al. |
| 6,763,607 | B2 | 7/2004 | Beyernick et al. |
| 6,902,715 | B2 | 6/2005 | Maus et al. |
| 6,966,941 | B1 | 11/2005 | Grobler et al. |
| 2004/0082044 | A1 | 4/2004 | Prevost et al. |
| 2006/0194296 | A1 | 8/2006 | Hammond et al. |
| 2006/0286654 | A1 | 12/2006 | Kinley et al. |
| 2007/0089356 | A1 | 4/2007 | Krasutsky et al. |
| 2007/0225463 | A1 | 9/2007 | Femal et al. |
| 2008/0176298 | A1 | 7/2008 | Randhava et al. |
| 2008/0213429 | A1 | 9/2008 | Binder et al. |
| 2008/0279981 | A1 | 11/2008 | Miller et al. |
| 2009/0004712 | A1 | 1/2009 | Rehkopf et al. |
| 2009/0019720 | A1 | 1/2009 | Grobler et al. |
| 2009/0087452 | A1 | 4/2009 | Tate et al. |

FOREIGN PATENT DOCUMENTS

WO WO 2007012951 A1 2/2007

OTHER PUBLICATIONS

Zbicinski, I., et al., Application of Puolse Combustion Technology in Spray Drying Process, Brazilian Journal of Chemical Engineering, Dec. 2000, 12 pages, vol. 17, No. 4-7, (Retrieved from the Internet URL: http://scielo.br/scielo.php?scruipt=sci_arttext&pld=S0104-66322000000400009.
Kudra, T., et al. Chapter 14-Pulse Combustion Drying, Advanced Drying Technologies, 2002, pp. 211-237, Marcel Dekker, Inc. New York, USA.
Zbicinski, I., et al. Pulse Combustion: An Advanced Technology for Efficient Drying, Chemical Engineering and Technology, vol. 25, No. 7, 2002, pp. 687-691.

*Primary Examiner* — Herbert J. Lilling
(74) *Attorney, Agent, or Firm* — Clise, Billion & Cyr. P.A.; Ben Armitage

(57) ABSTRACT

Dried distiller's solubles is described. Methods for drying condensed distiller's solubles into dried distiller's solubles are presented. The methods may include introducing the condensed distiller's solubles into a drying gas stream and recovering dried distiller's solubles from the drying gas stream.

10 Claims, 2 Drawing Sheets

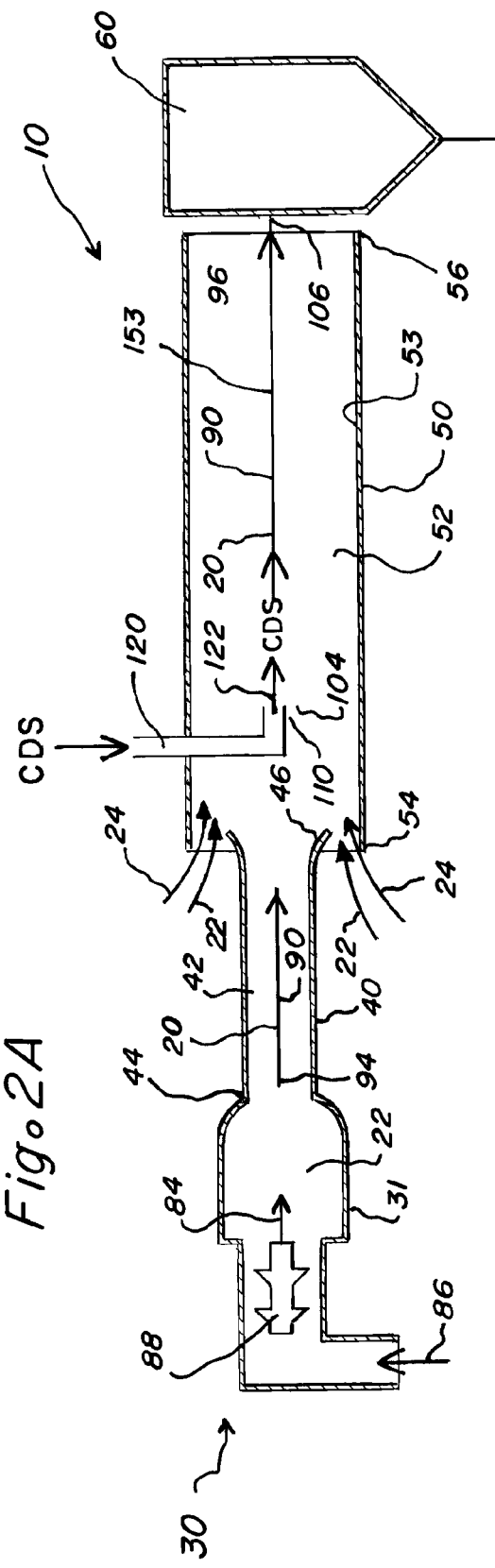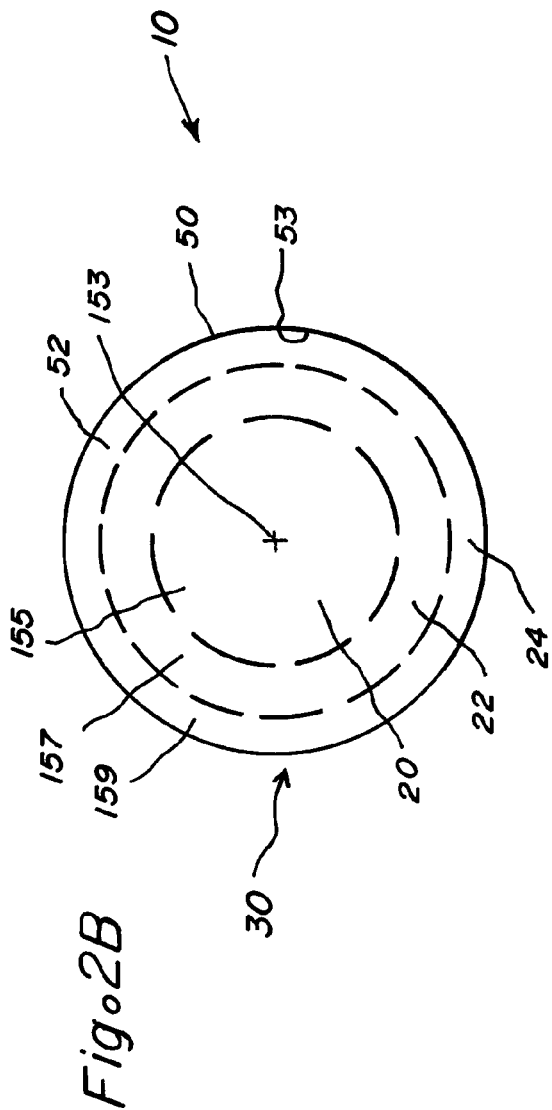

US 7,937,850 B2

METHODS AND APPARATUS FOR DRYING CONDENSED DISTILLER'S SOLUBLES (CDS) TO PRODUCE DRIED DISTILLER'S SOLUBLES (DDS)

CROSS REFERENCE TO RELATED APPLICATIONS

This application claims the benefit and priority of U.S. Provisional Application No. 61/068,191 filed on Mar. 5, 2008 and entitled, APPARATUS AND METHODS FOR THE PRODUCTION OF DRIED CDS, the disclosure of which is incorporated herein by reference in its entirety. This application is also a continuation-in part of U.S. patent application No. 12/215,214, filed on Jun. 25, 2008, and entitled, DRYING APPARATUS AND METHODS FOR ETHANOL PRODUCTION, which claims the benefit and priority and is a non-provisional of U.S. Provisional Application No. 60/937,073, filed on Jun. 25, 2007, and entitled, DRYING APPARATUS AND METHODS FOR ETHANOL PRODUCTION, both of which are incorporated herein by reference in their entireties.

FIELD OF THE INVENTION

The present inventions relate to apparatus and methods for ethanol production, and, more particularly, to the apparatus and methods for the drying of stillage produced by an ethanol production facility.

BACKGROUND

Stillage produced by an ethanol production facility may be fractionated into various stillage fractions including a suspended fraction. The suspended fraction includes materials generally suspended, solubilized, and/or dissolved in water. Drying of the suspended fraction into a dried form would generally preserve the suspended fraction, and might allow for storage and/or distribution of the suspended fraction in dried form. The suspended fraction in dried form may have nutritional value and may have utility in various industrial processes. In various aspects, the suspended fraction may include proteins, oils, amino acids, and other materials that make drying of the suspended fraction difficult without oxidizing and/or denaturing at least portions of the suspended fraction.

Accordingly, a need exists for compositions of the suspended fraction of stillage in a dried form as well as apparatus and methods for drying the suspended fraction of stillage.

SUMMARY

Methods, apparatus and compositions disclosed herein may resolve many of the needs and shortcomings discussed above and will provide additional improvements and advantages that may be recognized by those of ordinary skill in the art upon review of the present disclosure.

Methods are disclosed herein. The methods, in various aspects, include introducing condensed distiller's solubles (CDS) into a drying gas stream and recovering dried distiller's solubles (DDS) from the drying gas stream. The drying gas stream may have a high velocity in the range of about 60 meters per second to about 260 meters per second. In some embodiments, the drying gas stream may have a velocity between about 120 meters per second and about 160 meters per second. In some embodiments the drying gas stream may have a maximum velocity in the range of about 60 meters per second to about 260 meters per second, or from about 120 meters per second to about 160 meters per second. In some aspects, the gas stream may be a pulsed gas stream. In some embodiments, the CDS may be introduced into a gas stream having a temperature between about 600° F. and 1800° F., or between about 900° F. and about 1200° F. In some or other embodiments, the gas stream may have a second temperature, or outlet temperature ranging from about 120° F. to about 200° F. In some aspects, the CDS may be dried in a continuous process.

An apparatus is disclosed herein. The apparatus, in various aspects, includes an ethanol production facility and a pulse combustion dryer, the pulse combustion dryer in fluid communication with the ethanol production facility such that a suspended fraction of stillage may be communicated from the ethanol production facility to the pulse combustion dryer to be dried into dried distiller's solubles DDS. In other embodiments, the pulse combustion dryer may be separate from the ethanol production facility.

A composition is disclosed herein. In various aspects, the composition is DDS, with a moisture content between about 0.5% and about 10%, and wherein the DDS is formed by drying condensed distiller's solubles (CDS) in a drying gas stream in a continuous process.

Other features and advantages of the methods, apparatus, and compositions disclosed herein will become apparent from the following detailed description and from the claims.

BRIEF DESCRIPTION OF THE FIGURES

FIG. 2A illustrates by schematic diagram an embodiment of the pulse combustion dryer according to aspects of the present inventions; and FIG. 2B illustrates by schematic diagram a cross-section of an embodiment of the drying chamber according to aspects of the present inventions.

Figure 1:
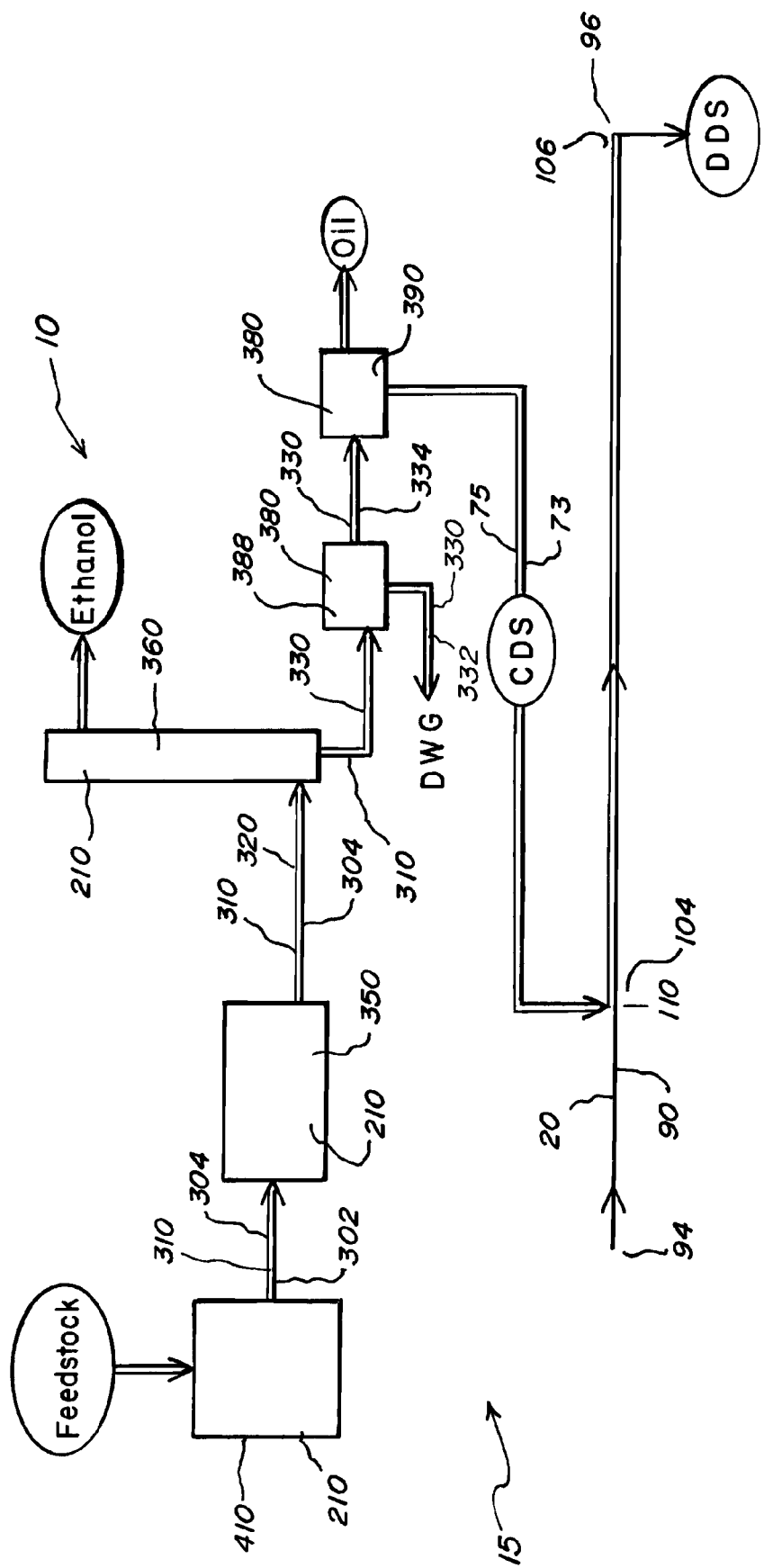
FIG. 1 illustrates by schematic diagram an exemplary embodiment of the production of CDS and the drying of CDS according to aspects of the present inventions.

All Figures are illustrated for ease of explanation of the basic teachings of the present inventions only; the extensions of the Figures with respect to number, position, order, relationship and dimensions will be explained or will be within the skill of the art after the following description has been read and understood. Further, the apparatus, materials and other operational parameters to conform to specific size, dimension, force, weight, strength, velocity, temperatures, flow and similar requirements will likewise be within the skill of the art after the following description has been read and understood.

Where used to describe the drawings, the terms "top," "bottom," "right," "left,""forward," "rear," "first," "second," "inside," "outside," and similar terms may be used, the terms should be understood to reference the structure and methods described in the specification and illustrated in the drawings as they generally correspond to their with the apparatus and methods in accordance with the present inventions as will be recognized by those skilled in the art upon review of the present disclosure.

DETAILED DESCRIPTION

Dried Distiller's Solubles (DDS) as a composition, production apparatus for DDS, and methods for the production of DDS are described herein. The DDS production apparatus may generate a drying gas stream to remove the water from Condensed Distiller's Solubles (CDS) in order to dry the CDS into DDS. In one aspect, the water is vaporized from the CDS by the drying gas stream to produce the DDS. The drying gas stream may be heated and/or pulsed in various aspects. Methods include drying CDS into DDS using the drying gas stream.

The Figures generally illustrate various exemplary embodiments of the DDS production apparatus 10, compositions, and methods. The particular exemplary embodiments illustrated in the Figures have been chosen for ease of explanation and understanding. These illustrated embodiments are not meant to limit the scope of coverage, but, instead, to assist in understanding the context of the language used in this specification and in the claims. Accordingly, variations of the DDS production apparatus 10, compositions, and methods that differ from the illustrated embodiments may be encompassed by the appended claims.

With reference generally to the Figures, in various aspects, the DDS production apparatus 10 may include an ethanol production facility 15, which includes one or more process units 210 configured to convert at least portions of a feedstock into fermentable components 302, to ferment the fermentable components 302 into ethanol, and to recover the ethanol. The feedstock in various aspects may be starch-based biomass such as corn and/or other grains, cellulosic biomass such as plant materials having high concentrations of cellulose and/or hemicellulose, or combinations thereof. In various aspects, the feedstock is combined with water to form a liquid-based processing stream 310, and the liquid-based processing stream 310 is communicated through the one or more process units 210. Water, as used herein, may include water, water in combination with various acids, bases, and buffers, and water in combination with other solvents, surfactants, and/or additives, and other solvents and/or volatiles.

The one or more process units 210 of the ethanol production facility 15, in various aspects, are configured to reduce polysaccharides such as starch and/or cellulose in the liquid-based processing stream 310 into fermentable components 302, to ferment the fermentable components 302 into ethanol, and to recover the ethanol from the liquid-based processing stream 310. In various aspects, the ethanol may be recovered in an anhydrous form. Stillage 330, in various aspects, is the remainder of the liquid-based processing stream 310 following the recovery of the ethanol from the liquid-based processing stream 310.

Ethanol, as used herein, includes ethanol as well as butanol and various other alcohols and other organic chemicals producible through fermentation of the fermentable components 302 of the feedstock. The fermentable components 302 of the feedstock may be fermented, at least in part, into ethanol by yeast. Yeast, as used herein, includes yeast, other fermentation microorganisms, complimentary microorganisms, and combinations thereof, as would be recognized by those of ordinary skill in the art upon study of this disclosure.

The ethanol production facility 15 in various aspects includes at least a fermentation unit 350 and a distillation column 360, and may include additional process units 210 generally configured to cooperate with the fermentation unit 350 and the distillation column 360 to produce ethanol from the feedstock material. The fermentation unit 350, in various aspects, is configured to receive the liquid-based processing stream 310 containing fermentable components 302. The fermentable components 302 in the liquid-based processing stream 310 may be fermented, at least in part, into ethanol by the fermentation unit 350, and the liquid-based processing stream 310 containing ethanol may be communicated from the fermentation unit 350 to the distillation column 360. The distillation column 360 captures the ethanol from the liquid-based processing stream 310. In various aspects, the distillation column 360 may be, for example, a distillation column, fractionation column, absorption column, adsorption column, or suchlike adapted to capture the ethanol from the liquid-based processing stream 310.

Stillage 330 is the remnant of the liquid-based processing stream 310 following capture of the ethanol from the liquid-based processing stream 310. Stillage 330 is an unrefined water-based mixture that may include unfermented fermentable components 302 of the feedstock as well as non-fermentable components 304 of the feedstock.

Stillage 330 may be fractionated into various stillage fractions including a settleable fraction 332 and a suspended fraction 334. The settleable fraction 332 includes non-dissolved settleable materials that generally settle out of the water component. In various aspects, the settleable fraction 332 is known in the industry as Distiller's Wet Grains (DWG) in the moist form and Dried Distiller's Grains (DDG) in the substantially dried form. The suspended fraction 334 includes the generally non-settleable materials that remain suspended, solubilized, and/or dissolved in the water component of the stillage 330. The suspended fraction 334, for example, may include dissolved materials, colloidal materials, and/or non-colloidal materials that are sufficiently fine and/or of low specific gravity that they generally remain in suspension.

Upon removal of the settleable fraction 332 from the stillage 330, the remainder that includes the suspended fraction 334 is termed thin stillage. The thin stillage, which may include a large fraction of water, may be concentrated in, for example, an evaporator, which removes a portion of the water from the thin stillage to produce syrup. As used herein, the term Condensed Distiller's Solubles (CDS) encompasses the suspended fraction 334 of stillage 330, and includes thin stillage and syrup derived from thin stillage. CDS may be generally liquid, syrup or other viscous fluid, or slurry, paste, or other non-Newtonian fluid, and the CDS may include various agglomerations, aggregations, non-homogeneities, and/or clumps of material. Dried Distiller's Solubles (DDS) as used herein includes CDS in a dried form—i.e. the suspended fraction 334 in the dried form as well as various fractions and variants of the suspended fraction 334 of stillage 330 in the dried form, so that the components of DDS generally include the non-water components of CDS. DDS may be generally a powder, a granular material, or similar in various aspects.

In various aspects, the CDS may include components of the feedstock that pass through the process units 210 of the ethanol production facility 15, and may also include waste yeast including yeast cells and/or portions of yeast cells wasted from the process units 210. The CDS, in various aspects, includes oils, proteins, amino acids, non-fermented sugars, unconverted starches, unconverted cellulose, and other materials that may be sensitive to heat and may oxidize, denature, or otherwise may be altered by heat. The CDS, in various aspects, may include fiber, and may include minerals such as phosphorous, sulfur, and calcium. The CDS may include, in various aspects, various additives such as buffers, acids, and/or bases for the adjustment/control of the pH and salts thereof, fillers, binding agents, and preservatives. The corresponding DDS would generally include the non-water portions of the CDS such as, for example, oils, proteins, amino acids, non-fermented sugars, unconverted starches, unconverted cellulose, minerals, salts, binding agents, and preservatives.

In some aspects, the ethanol production facility 15 may be configured to convert starch-based biomass feedstock into ethanol, and the resulting CDS includes the generally suspended and/or solubilized non-fermentable components 304 of the starch-based biomass feedstock. For example, the starch-based biomass may be grain such as corn. The grain includes starch as well as germ, fiber, and gluten. The germ, fiber, and gluten in the grain may be communicated through the process units 210 of the ethanol production facility 15 along with the starch as the starch is converted into fermentable sugar and the fermentable sugar is fermented into ethanol. Accordingly, the resulting CDS may generally include suspended and/or solubilized non-fermentable materials in the grain feedstock such as germ, fiber, and gluten, and may also include waste yeast, and may also include unfermented fermentable sugars and unconverted starch and oligosaccharides. The corresponding DDS would generally include corresponding materials in substantially dried form in various aspects.

In other aspects, the germ, fiber, and/or gluten in the grain may be removed by one or more process units 210 prior to fermentation, and the resulting CDS may generally include the suspended and/or solubilized non-fermentable portions of the grain feedstock that remain following removal of the germ, fiber, and/or gluten, as well as waste yeast and starches that escaped conversion into sugar, and may also include unfermented fermentable materials such as unfermented sugar. The corresponding DDS would generally include corresponding materials in substantially dried form in various aspects.

In other aspects, the ethanol production facility 15 may be configured to convert cellulosic biomass feedstock into ethanol, and the resulting CDS includes the generally suspended and/or solubilized non-fermentable components 304 of the cellulosic biomass feedstock. The corresponding DDS would generally include the generally suspended and/or solubilized non-fermentable components 304 of the cellulosic biomass feedstock in substantially dried form in various aspects and may include unconverted cellulose, various oligosaccharides, and/or unfermented fermentable components.

The ethanol production facility 15 may include, in various aspects, one or more stillage processing units 380 such as, for example, a centrifuge unit, a filter unit, flocculator, evaporator, and combinations thereof adapted to fractionate the stillage 330 into CDS (the suspended fraction 334), reduce the water content of the CDS to produce a syrupy form of CDS, and/or otherwise process the CDS. For example, in various aspects, the one or more stillage processing units 380 may include an oil removal unit 390 adapted to remove oil from the CDS. The oil may be a component of a grain based feedstock such as corn oil in corn. The oil removal unit 390 may remove the oil by skimming, centrifugation, or solvent extraction, or in other ways that would be recognized by those of ordinary skill in the art upon review of this disclosure. An example of apparatus and methods for the removal of oil from stillage is given in U.S. Patent Publication Number 2007/0238891 filed Mar. 20, 2007, which is hereby incorporated herein in its entirety by reference.

CDS may contain about 14-40% solids. In some embodiments, CDS contains about 30-40% solids.

The DDS production apparatus 10 may generate the drying gas stream 20, and CDS may be dried into DDS by introducing CDS into the drying gas stream 20 and recovering DDS from the drying gas stream 20. The drying gas stream 20 vaporizes the water in the CDS to dry the CDS into DDS. CDS may be continuously introduced into the drying gas stream 20 and DDS may be continuously recovered from the drying gas stream 20 over a period of time in a continuous process, as opposed to a batch process.

The DDS is drier than, and may be substantially drier than, the CDS. In some aspects, substantially all of the water is removed from the DDS, while, in other aspects, the DDS retains some residual amount of water. The water content of the DDS may be between about 0.5% and about 10%, and may, in certain aspects, be from about 6% to about 8%.

In certain aspects, the drying gas stream 20 may consist generally of air and combustion products produced by the combustion of various solid, liquid, or gaseous fuels or combinations thereof. Examples of fuels would include propane, natural gas, and kerosene. In other aspects, the drying gas stream 20 may consist of heated air or other gas propelled by the release of compression. In various aspects, the drying gas stream 20 may include other gases or combinations of gases, which may be heated in various ways and configured to form the flowing drying gas stream 20, as would be recognized by those of ordinary skill in the art upon review of this disclosure.

In some aspects, the drying gas stream 20 may be characterized by a generally continuous flow. In other aspects, the drying gas stream 20 may be pulsed, and the pulses may have a frequency that may range from about 30 Hz to about 1,000 Hz. In various aspects, the drying gas stream 20 may include regions of high velocity flow, turbulence, and may include supersonic flows and shock waves. Pressures in the drying gas stream 20 may be about $2 \times 10^4$ Pa (gage) or more in various aspects. Sound pressures in the drying gas stream 20 may fall in the range of about 100 dB to about 200 dB in various aspects. In various aspects, a swirl component may be induced into the flow of the drying gas stream 20.

The flowing drying gas stream 20 defines a flow path 90 having a first end 94 and a second end 96 with the drying gas stream 20 flowing generally from the first end 94 to the second end 96. The first end 94 of the flow path 90 may be generally coincident with the location at which the drying gas stream 20 is generated. The second end 96 of the flow path 90 may be generally coincident with the region from which the DDS is recovered from the drying gas stream 20 and may be defined by various structures configured to recover the DDS. The CDS may be introduced into the flowing drying gas stream 20 at an introduction location 110, with the introduction location 110 disposed along the flow path 90 generally between the first end 94 and the second end 96.

One or more passages 120, which may be defined by tubes, channels, pipes, or other structures, with each passage 120 having one or more passage outlets 122 adapted for the introduction of CDS into the drying gas stream 20 may be located in the flow path 90 between the first end 94 and the second end 96, and the location of the passage(s) 120 in the flow path 90 defines the introduction location(s) 110. CDS may be introduced into the drying gas stream 20 at the introduction location(s) 110 through the passage(s) 120. Pumps, piping, valves, and other such structures may be provided in various aspects to convey the CDS to the passage(s) 120 for introduction into the drying gas stream 20 at the introduction location(s) 110 as would be recognized by those of ordinary skill in the art upon review of this disclosure.

The temperature of the drying gas stream 20 may be 2,300° F. or more generally proximate the first end 94 of the drying gas stream 20, which may be excessive for drying CDS. Accordingly, the temperature of the drying gas stream 20 may be controlled, in various aspects, to provide a first temperature 104 generally proximate the introduction location 110 and/or a second temperature 106 generally proximate the second end 96 of the flow path 90. The temperature of the drying gas stream 20 may be controlled in various aspects to control the first temperature 104 of the drying gas stream 20 generally proximate the first end 94 of the flow path 90 where the CDS may be introduced into the drying gas stream 20. The temperature of the drying gas stream 20 may be controlled in various aspects to control the second temperature 106 of the drying gas stream 20 generally proximate the second end 96 of the flow path 90 where the DDS may be recovered from the drying gas stream 20.

For example, one or more gas flows may be combined with the drying gas stream 20 as the drying gas stream 20 flows along the flow path 90 to control, at least in part, the first temperature 104 of the drying gas stream 20 at introduction location 110. The one or more gas flows combined with the drying gas stream 20 may control, at least in part, the temperature at the second end 96 of the flow path 90. The one or more gas flows combined with the drying gas stream 20 may control, at least in part, the temperature variation between the first temperature 104 and the second temperature 106. In various aspects, one or more gas flows may be combined with the drying gas stream 20 to provide for the uptake of water vapor and/or for other purposes as would be recognized by those of ordinary skill in the art upon review of this disclosure. In various aspects, conditions at the first end 94 of the flow path 90 may be adjusted in order to achieve a specific first temperature 104 and/or specific second temperature 106.

The first temperature 104 and/or the second temperature 106 may be chosen depending upon the nature of the CDS to be introduced into the drying gas stream 20 in order to be dried into DDS. First and second temperatures 104, 106 may be selected so that volatile organic content (VOC), which may contain valuable nutrients, are not vaporized by high temperatures. For example, in various aspects, the first temperature 104 may range from about 600° F. to about 2100° F. and the second temperature 106 may range from about 130° F. to about 200° F. In one embodiment, the first temperature 104 may be about 1,000° F. while the second temperature 106 may be about 150° F. In other aspects, the first temperature 104 may be about 600° F. to about 1200° F. and the second temperature 106 may be about 130° F. to about 200° F. In another embodiment, the first temperature 104 may be about 1800° F. and the second temperature 106 may be about 150° F. In yet another embodiment, the first temperature 104 may be about 1200° F. and the second temperature 106 may be about 140° F.

The highly turbulent drying environment, due the high velocity of drying gas stream 20, atomizes a viscous input, such as CDS, into smaller particles so that particles are dispersed. The high temperature gas stream 20 quickly evaporates the water from the small particles. The highly turbulent environment allows rapid mixing and communication between the hot drying gas stream 20 and the atomized particles. The difference between the first and second temperatures 104, 106 of gas stream 20, ΔT, may be as large as 2000° F. In some aspects, ΔT ranges from 400° F. to about 1700° F. In some embodiments, ΔT is about 1650° F. Large ΔTs allow for flash drying, in fractions of seconds to milliseconds or less, so that the temperature of drying particles is never higher than approximately the second temperature 106. In some embodiments, drying of particles occurs in 1/1000 to 1 second, including, without limitation, 1/1000, 1/100, 1/10, 1/5, 1/4, 1/3, 1/2, 2/3, 3/4 seconds, or 1 second.

In some aspects, atomizing air, including, without limitation, gas dynamic atomizing is used to atomize the CDS. In some aspects, no spray nozzle is used. Using atomizing air to disperse the CDS into droplets, has a number of advantages over other drying methods, including spray drying. In general, spray dryers use either rotating disks or high pressure nozzles, which result in high shear forces. In contrast, gas or air atomization results in low or no shear forces. Pressures upstream of an atomizing venturi range from two to six psi above atmospheric pressure (14.7 psi). In addition, the hot air in conventional spray dryers is very slow moving, and much less turbulent than pulse combustion drying hot air. Accordingly, atomizing air at a very high first temperature, in concert with a low second temperature, (i.e., high ΔT) results in extreme turbulence when a high velocity gas stream, which may be near sonic velocity, is introduced into the drying chamber. This allows for very rapid drying. Spray drying methods generally use much lower ΔTs, and much lower gas velocity, resulting in little or no turbulence and much longer drying times. Longer drying times require much larger drying chambers for spray drying, which increase capital costs dramatically.

The CDS may be introduced into the drying gas stream 20 at the introduction location 110 to be exposed to the temperature of the drying gas stream 20 while being conveyed by the drying gas stream 20 from the introduction location 110 to the second end 96 of the flow path 90. The CDS may be exposed to the temperature of the drying gas stream 20 for an exposure time that may be on the order of fractions of a second, and, in some aspects, on the order of a millisecond or less. The temperature of the drying gas stream 20 may cause water associated with the CDS to flash into the vapor phase, while the latent heat of vaporization of the water in combination with the exposure time may keep the CDS generally cool thereby protecting the CDS from the temperature of drying gas stream 20. Turbulence, high velocities, and/or shock waves in the drying gas stream 20 may strip water from the CDS and may otherwise increase the rate of evaporation of water from the CDS by various mechanisms. The latent heat of evaporation of the water may also cool the drying gas stream 20, at least in part, from the first temperature 104 to the second temperature 106, so that the water content of the CDS may, in some aspects, control the second temperature 106 and may control the temperature variation between the first temperature 104 and the second temperature 106, at least in part. The rate at which CDS is fed into the drying gas stream 20 may control the first temperature 104, may control the second temperature 106, and may control the form of the temperature gradient between the first temperature 104 and the second temperature 106.

In some aspects, the gas stream 20 has a maximum velocity of between about 12,000 feet/minute (fpm) and about 50,410 fpm, (which translates to velocities between about 61 meters/sec and 256 meters/sec), and in some embodiments maximum velocities are between about 24,000 fpm and about 30,000 fpm (which translates to velocities between about 122 meters/second and 153 meters/second), but may range upward into supersonic velocities (67,000 fpm, or 343 meters/sec). When the flow is pulsed the gas stream 20 may oscillate between a lower value and the maximum velocity as will be recognized by those skilled in the art. When the gas stream is continuous, the maximum velocity will be maintained within a range or at a desired velocity within these ranges.

The high velocities result in extreme turbulence, which produces high heat transfer rates, leading to higher efficiency drying.

The evaporative rate may range from about 300 to about 600 pounds of water per hour in a dryer with a heat release of 1 million BTU per hour. The thermal efficiency may range from about 1200 to about 1800 BTU per pound of water removed. In some embodiments the thermal efficiency may be about 1200 BTU per pound of water removed; in other embodiments, the thermal efficiency may be about 1300, 1400, 1500, 1600, 1700 or 1800 BTU per pound of water removed.

In some aspects, drying CDS to DDS may be a continuous process. In some embodiments using a large dryer, water from the CDS may be evaporated at a rate of about 10,000 pounds per hour to about 50,000 pounds per hour.

A collector 60 may be positioned about the second end 96 of the flow path 90 to recover the DDS from the drying gas stream 20, and the collector 60 may generally define the second end 96 of the flow path 90. The collector 60 may be a cyclone, baghouse, screen or series of screens, filter(s), or similar, or combinations thereof configured to capture the DDS from the drying gas stream 20 as would be recognized by those of ordinary skill in the art upon review of this disclosure. The collector 60 may be configured to cooperate with various material handling and storage mechanisms for the manipulation and/or storage of DDS, as would be recognized by those of ordinary skill in the art upon review of this disclosure.

In some aspects, the drying gas stream 20 may be generated by a pulse combustion dryer 30. Examples of pulse combustion dryers 30 are described in U.S. Pat. Nos. 3,462,995, 4,708,159, 4,819,873, and 4,941,820 to Lockwood. The pulse combustion dryer 30 may include a combustor 31 that defines a combustion chamber 32, and a tailpipe 40 that defines a tailpipe passage 42 having a first tailpipe passage end 44 and a second tailpipe passage end 46. The tailpipe passage 42 is in fluid communication with the combustion chamber 32 through the first tailpipe passage end 44.

The pulse combustion dryer 30, in some aspects, may include a drying chamber 50 that defines a drying chamber passage 52 having a first drying chamber passage end 54, a second drying chamber passage end 56, and centerline 153. The first drying chamber passage end 54 of the drying chamber 50 may be disposed with respect to the second tailpipe passage end 46 of the tailpipe 40 so that the drying chamber passage 52 is in fluid communication with the tailpipe passage 42, and, thence, in fluid communication with the combustion chamber 32. The combustor 31, tailpipe 40, and drying chamber 50 may be disposed with respect to one another in a variety of ways and may assume a variety of orientations with respect to the vertical that would be readily recognized by those of ordinary skill in the art upon review of this disclosure.

Combustion air 86 and fuel 84 may be admitted into the combustion chamber 32, and the resulting fuel-air mixture ignited periodically to provide the drying gas stream 20 in the form of a series of pulses of air mixed with heated combustion products. Combustion of the fuel-air mixture may be generally complete so that the heated combustion products would consist largely of carbon dioxide and water vapor. The drying gas stream 20 may flow from the combustion chamber 32, thru the tailpipe passage 42 from the first tailpipe passage end 44 to the second tailpipe passage end 46. In aspects that include the drying chamber 50, the drying gas stream 20 may be communicated from the tailpipe passage 42 into the drying chamber passage 52 generally proximate the first drying chamber passage end 54, and the drying gas stream 20 may flow through the drying chamber passage 52 generally from the first drying chamber passage end 54 to the second drying chamber passage end 56. Thus, the flow path 90 of the drying gas stream 20 includes the combustion chamber 32, the tailpipe passage 42, and, in aspects that include the drying chamber 50, the flow path 90 also generally includes the drying chamber passage 52. The first end 94 of the flow path 90 may be generally coincident with the combustion chamber 32.

In aspects wherein the drying gas stream 20 is generated by the pulse combustion dryer 30, the collector 60 may be disposed generally proximate the tailpipe passage second end 96 or, in aspects that include the drying chamber 50, generally proximate the second drying chamber passage end 56 to recover the DDS. As would be understood by those of ordinary skill in the art upon review of this disclosure, the collector 60 may be disposed in other ways with respect to the drying chamber 50 to recover the DDS from the second end 96 of the flow path 90 of the drying gas stream 20.

The CDS may be introduced into the drying gas stream 20 at the introduction location 110. In various aspects, the introduction location 110 may be within the tailpipe passage 42 or within the drying chamber passage 52. The CDS may be entrained in the drying gas stream 20 generally at the introduction location 110 and dried into DDS while being conveyed by the drying gas stream 20 along the portion of the flow path 90 from the introduction location 110 to the second end 96 of the flow path 90. The DDS may be recovered proximate the second end 96 of the flow path 90 of the drying gas stream 20 by the collector 60.

The CDS may be introduced into the drying gas stream 20 at the introduction location 110 from one or more passages 120 through one or more passage outlets 122 defined by the one or more passages 120 disposed about the drying gas stream 20 at the introduction location 110 for that purpose. The CDS may pass through the one or more passages 120 into the drying gas stream 20 by gravity feed and/or by the application of pressures, which may be quite minimal. Pressure pulses in the drying gas stream 20 may aid in drawing the CDS through the passage 120 and into the drying gas stream 20. Accordingly, the shear forces that the CDS is subjected to while passing through the passage 120 may be generally small or negligible. In various aspects, the rate at which CDS is fed into the drying gas stream 20 may be controllable.

In some aspects, nozzles, sprayers, or similar may be appended to the passage 120 to disperse the CDS from the passage outlet 122 into the drying gas stream 20. However, this may not be necessary, as the velocity of the flow of the drying gas stream 20 may be sufficient to disperse the CDS including the atomization of any agglomerations, aggregations, non-homogeneities and/or clumps of materials. The shock waves and/or turbulence in the drying gas stream 20 may disperse the CDS. Sound waves in the drying gas stream 20 may sonicate the CDS, which may aid in the dispersal of the CDS into the drying gas stream 20. Pressure pulses in the drying gas stream 20 may also aid in the dispersal of the CDS into the drying gas stream 20.

FIG. 1 illustrates by schematic diagram an embodiment of the DDS production apparatus 10 and associated methods. As illustrated, the DDS production apparatus 10 includes an ethanol production facility 15 adapted to produce ethanol from feedstock. The ethanol production facility, as illustrated, includes process units 210 configured as a first process unit 410, fermentation unit 350 and distillation column 360. The feedstock, in this embodiment, is input into first process unit 410, which processes the feedstock into fermentable components 302 and non-fermentable components 304, and the fermentable components 302 and non-fermentable components 304 are communicated via the liquid based processing stream 310 from the first process unit 410 to the fermentation unit 350. The fermentable components 302 are generally fermented into ethanol by the fermentation unit 350, as illustrated. In this embodiment, the liquid based processing stream 310 containing ethanol 320 and non-fermentable components 304 of the feedstock is communicated to the distillation column 360. The ethanol is captured from the liquid based processing stream 310 by the distillation column 360, as illustrated, and the remainder of the liquid based processing stream 310 is discharged from the distillation column 360 as stillage 330.

As illustrated, the stillage 330 is processed by stillage processing units 380 configured as centrifuge unit 388 and oil removal unit 390. The stillage 330, in this embodiment, is communicated from the distillation column 360 to the centrifuge unit 388, which separates the stillage 330 into the settleable fraction 332 and the suspended fraction 334. As illustrated, the settleable fraction 332 is discharged from the centrifuge unit 388 as DWG, and the suspended fraction 334 (CDS) is communicated to the oil removal unit 390. The oil removal unit 390 generally removes oil 322 from the CDS, and the de-oiled CDS is communicated into drying gas stream 20 to be dried into DDS in this embodiment.

FIG. 1 illustrates by schematic diagram methods of drying CDS into DDS using the drying gas stream 20. This Figure depicts the drying gas stream 20 flowing along flow path 90 from the first end 94 to the second end 96. The CDS is introduced into the drying gas stream 20 at introduction location 110, as illustrated. The CDS is dried by the drying gas stream 20 while carried by the drying gas stream 20 from the introduction location 110 to the second end 96 of the flow path 90. The DDS is recovered from the drying gas stream 20 proximate the second end 96 of the flow path 90, the location or locations at which the DDS is recovered from the drying gas stream 20 generally defining the second end 94 of the flow path 90.

An embodiment of the pulse combustion drier 30 is generally illustrated in FIG. 2A. The embodiment of FIG. 2A includes the combustor 31, the tailpipe 40 and the drying chamber 50. As illustrated, the combustion chamber 31 fluidly communicates with the tailpipe passage 42 through the first tailpipe passage end 44. The tailpipe 40, as illustrated, is disposed with respect to the drying chamber 50 such that the tailpipe passage 42 fluidly communicates through the second tailpipe passage end 46 into the drying chamber passage 52 generally proximate the first drying chamber passage end 54. The collector 60 is disposed downstream of the second drying chamber passage end 56, and the drying chamber passage 52 fluidly communicates with the collector 60 through the second drying chamber passage end 56, as illustrated. In other embodiments, the collector 60 could be otherwise disposed with respect to the drying chamber 50. For example, at least a portion of the collector 60 could be positioned within a portion of the drying chamber passage 52 generally proximate the second drying chamber passage end 56.

In the embodiment illustrated in FIG. 2A, the drying gas stream 20 is generated within the pulse combustion dryer 30 and the CDS is introduced into the drying gas stream 20 to be dried into the CDS. Fuel 84 and combustion air 86 are admitted into the combustion chamber 32 defined by the combustor 31 to be ignited periodically in order to produce the drying gas stream 20, as illustrated. An air valve 88 is disposed in the path of the combustion air 88 in this embodiment to admit combustion air 86 into the combustion chamber 32 while generally preventing backflows of the drying gas stream 20. As illustrated in FIG. 2A, the flow of the drying gas stream 20 from the combustion chamber 32, through the tailpipe passage 42, through the drying chamber passage 52 and into the collector 60 defines the flow path 90. The first end 94 of the flow path 90 is generally within the combustion chamber 32, and the second end 96 of the flow path 90 is generally proximate the collector 60, which is disposed about the second drying chamber passage end 56 of the drying chamber 50, in this embodiment.

CDS may be introduced into the drying gas stream 20 at the introduction location 110 through the passage outlet 122 defined by passage 120 in the embodiment illustrated in FIG. 2A. In this embodiment, a portion of the tailpipe 40 extends into the drying chamber passage 52 of the drying chamber 50, and the introduction location 110 is within the drying chamber passage 52 generally proximate the tailpipe passage second end 46 and generally proximate the first drying chamber passage end 54. The passage 120 is disposed within the drying chamber passage 52 to introduce the CDS into the drying gas stream 20 generally proximate the centerline 153 of the drying chamber passage 52, as illustrated in FIG. 2A.

In other embodiments, a plurality of passages 120 may be provided and these may define a plurality of introduction locations 110. One or more passages 120 may be disposed within the drying chamber passage 42, in some embodiments, to introduce the CDS into the drying gas stream 20 at an off-set from the centerline 153. For example, a plurality of passages 120 may be disposed circumferentially within the drying chamber passage 42 with each passage 120 of the plurality of passages 120 positioned to introduce the CDS into the drying gas stream 20 at a constant radial location with respect to the centerline 153.

As illustrated in FIG. 2A, the CDS may be introduced into the drying gas stream 20 through the passage outlet 122 to be entrained into the drying gas stream 20 and dried into DDS. The collector 60 is positioned proximate the second drying chamber passage end 56 and generally defines the second end 96 of the flow path 90, in this illustrated embodiment. The DDS may then be recovered from the drying gas stream 20 by the collector 60.

As illustrated in FIG. 2A, one or more additional airflows may be admitted into the drying chamber passage 52 in various embodiments of the pulse combustion dryer 30. In the embodiment of FIG. 2A, quench air 22 may be admitted into the drying chamber passage 52 generally proximate the first drying chamber end 54 to control the temperature of the drying gas stream 20 within the drying chamber passage 52. The quantity of quench air 22 admitted into the drying chamber passage 52 may be regulated in order to control the temperature of the drying gas stream 20 including the first temperature 104 and the second temperature 106. In this embodiment, dilution air 24 may also introduced into the drying chamber passage 52 generally proximate the first drying chamber passage end 54 to provide thermodynamic space for the uptake of water evaporated from the CDS in order to prevent water condensation and/or saturation conditions in the drying chamber passage 52 and/or in the collector 60. The quantity of dilution air 24 admitted into the drying chamber passage 52 may be regulated in various embodiments.

As illustrated in FIG. 2A, the drying gas stream 20 may pass through a core region 155 generally proximate the centerline 153 of the drying chamber passage 52. The dilution air 24 may pass through the wall region 159 of the drying chamber passage 52, which is the portion of the drying chamber passage 52 generally proximate the inner wall 53 of the drying chamber 50. The quench air 22 may pass through an intermediate region 157, which is intermediate between the wall region 159 and the core region 155.

CDS may be introduced into the drying gas stream 20 passing though the core region 155. The quench air 22 and/or the dilution air 24 may prevent or at least diminish contact between the CDS/DDS and the inner wall 53 of the drying chamber 50 as the CDS/DDS is carried through the drying chamber passage 42 by the drying gas stream 20 in order to generally reduce or eliminate deposition of DDS onto the inner wall 53.

FIG. 2B illustrates a cross-section of the embodiment of the drying chamber 50 generally illustrated in FIG. 2A. As illustrated in FIG. 2B, the drying chamber 50 defines a drying chamber passage 52 having a substantially circular cross-section. In this embodiment, the flows of the drying gas stream 20, the quench air 22, and the dilution air 24 through the drying chamber passage 52 generally define three regions within the drying chamber passage. These three regions include the core region 155 generally proximate the centerline 153 through which the drying gas stream 20 generally passes, the intermediate region 155 through which the quench air 22 generally passes, and the wall region 159 through which the dilution air 24 generally passes. The pulse combustion dryer 30 may be configured to regulate the amount of quench air 22 and/or the amount of dilution air 24 admitted into the drying chamber passage 52 in order to regulate temperature and other conditions within the drying chamber passage 52. In other embodiments, one or more airstreams could be introduced into the drying chamber passage 52 at various locations about the drying chamber passage 52 to cool the drying gas stream 20, provide thermodynamic space for evaporation, or for other purposes as would be understood by those of ordinary skill in the art upon review of this disclosure.

The drying gas stream 20 has a first temperature 104 generally proximate the introduction location 110, as illustrated in FIG. 2A. The drying gas stream 20 has a second temperature 106 generally proximate the second end 96 of the flow path 90 of the drying gas stream 20, as illustrated. In various embodiments, the pulse combustion dryer 30 may be configured to regulate the amount of additional gas flows such as the quench air 22 and the dilution air 24 admitted into the drying gas stream 20 to regulate the temperature of the drying gas stream 20 including the first temperature 104 and the second temperature 106. In various embodiments, the admission of fuel into the combustion chamber 32 may be controlled, the pulse rate of the pulse combustion dryer 30 may be regulated, and/or the pulse combustion dryer 30 may be configured and/or controlled in other ways to regulate the temperature of the drying gas stream 20 including the first temperature 104 and the second temperature 106, as would be recognized by those of ordinary skill in the art upon review of this disclosure. The temperature of the drying gas stream 20 including the first temperature 104 and the second temperature 106 may be adjusted, in various aspects, to produce DDS from CDS while not substantially denaturing proteins and/or oxidizing oils that may be present in the CDS/DDS.

DDS may have the following characteristics. The moisture content may range from about 0.5% to about 15%. The dried DDS particles may be generally spherical in shape.

Methods may include introducing the CDS into the drying gas stream 20 and recovering the DDS from the drying gas stream 20. Various aspects may include continuously introducing CDS into the drying gas stream 20 and continuously recovering DDS from the drying gas stream 20 in a continuous process. Some aspects include pulsing the drying gas stream 20. Some aspects include generating the drying gas stream 20 using a pulse combustion dryer 30.

EXAMPLES

A further understanding may be obtained by reference to certain specific examples, which are provided herein for the purpose of illustration only and are not intended to be limiting unless otherwise specified.

Example 1

The CDS in this example is derived from an ethanol production facility 15 configured to produce ethanol from a corn feedstock by conversion of cornstarch into fermentable sugar with subsequent fermentation of the fermentable sugar into ethanol. The ethanol production facility 15 is a dry grind facility that includes one or more process units 210 configured to mill the corn feedstock in order to make the starch in the corn feedstock accessible for conversion into fermentable sugar in subsequent process units 210. The germ, fiber, and gluten in the corn feedstock are communicated through the process units 210 with the liquid based processing stream 310 along with the cornstarch in the corn feedstock as the cornstarch is converted into fermentable sugar and the fermentable sugar is fermented into ethanol. Accordingly, the CDS in this example may generally include non-fermentable portions of the corn feedstock such as portions of the germ, fiber, and gluten, and may also include waste yeast. The CDS is introduced into the flowing drying gas stream 20 within a pulse combustion dryer 30 in this example. The pulse combustion dryer 30, in this example, is a Model P1 manufactured by Pulse Combustion Systems, Inc. of Payson, Ariz. The pulse combustion dryer settings are given in Table 1.

TABLE 1

| Pulse Combustion Dryer Settings - Example 1 | |
|---|---|
| Heat Release | 702,000 BTU/hr |
| Turbo Air | 80.0 psi |
| Combustion Air | 36.5% |
| Rotary Valve | 84.5% |
| Feed Pump Speed | 13.35% |
| Combustion air pressure | 4.43 psi |
| Contact Temperature | 782° F. |
| Exit Temperature | 180° F. |

Performance data for the pulse combustion dryer is given in Table 2. As indicated in Table 2, the CDS is approximately 33.2% solids, and about 66.6% of the solids were recovered in the DDS. Although in some aspects CDS in the form of thin stillage may be introduced directly into the pulse combustion dryer 30, it may be more efficient to condense the thin stillage into syrup and then introduce the syrup (i.e. CDS in syrup form) into the drying gas stream 20 of the pulsed combustion dryer 30.

TABLE 2

| Pulse Combustion Dryer Performance - Example 1 | |
|---|---|
| Net Feed During Run (kg) | 256 |
| Percentage of solids | 33.2% |
| Dry solids fed during run (kg) | 85 |
| Cyclone Recovery (kg) | 10 |
| Blow-down Recovery (kg) | 47 |
| Cyclone Yield (%) | 11.8 |
| Blow-down Yield (%) | 54.8 |
| Dryer Yield (%) | 66.6 |
| Cyclone Moisture (%) | 5.00 |
| Blow-down Moisture (%) | 4.15 |
| Water Evaporated (lb) | 377 |
| Evaporative Rate (lb/hr) | 377 |
| Thermal Efficiency (BTU/lb water evaporated) | 1,861 |

A sample, termed Sample 1, of DDS produced from CDS under the operating conditions given in Table 1 was analyzed. The results of the analysis are presented in Table 3 and Table 4.

A gross analysis of Sample 1 is presented in Table 3. The mineral analysis was performed using a wet digest procedure. The water content was determined by heating Sample 1 for 3 hours at 105° C. Oil (fat/lipid) analysis was performed using a solvent extraction procedure. Oil and protein (amino acids) were present in Sample 1.

TABLE 3

Sample Analysis DDS

| Component | Sample 1 | |
|---|---|---|
| Water Content | 6.57 | — |
| Dry Matter (%) | 93.43 | — |
| Crude Protein (%) | 20.2 | 21.6 |
| Acid Hydrolysis Fat (%) | 14.4 | 15.9 |
| Crude Fiber (%) | 2.92 | 3.13 |
| Ash (%) | 7.75 | 8.30 |
| Sulfur (%) | 1.26 | 1.35 |
| Phosphorous (%) | 1.31 | 1.41 |
| Calcium (%) | 0.06 | 0.06 |

Ash included minerals such as potassium and magnesium.

The protein portion of Sample 1 was broken down into constituent amino acids, and the resulting amino acid panels for Sample 1 obtained using high pressure liquid chromatography with post-column derivatization. The amino acid panel for Sample 1 is presented in Table 4. The detection limit for the amino acids in this example is about 0.01%.

TABLE 4

Sample Analysis DDS

| Component | Sample 1 |
|---|---|
| Alanine (%) | 1.40 |
| Arginine (%) | 1.19 |
| Aspartic acid (%) | 1.56 |
| Cystine (%) | 0.59 |
| Glutamic acid (%) | 3.38 |
| Glycine (%) | 1.10 |
| Histidine (%) | 0.64 |
| Isoleucine (%) | 0.61 |
| Leucine (%) | 1.57 |
| Total lysine (%) | 0.97 |
| Methionine (%) | 0.39 |
| Phenylalanine (%) | 0.93 |
| Proline (%) | 1.37 |
| Serine (%) | 1.00 |
| Threonine (%) | 0.86 |
| Tyrosine (%) | 0.63 |
| Tryptophan (%) | 0.23 |

Example 2

In example 2, the ethanol production facility 15 is a dry grind facility that includes one or more process units 210 configured to mill corn feedstock in order to make the starch in the corn feedstock accessible for conversion into fermentable sugar in subsequent process units 210. This is a different ethanol production facility than that of example 1. The CDS in example 2 may generally include non-fermentable portions of the corn feedstock such as portions of the germ, fiber, and gluten, and may also include waste yeast. The CDS is introduced into the drying gas stream 20 within the pulse combustion dryer 30. At least a portion of the oil (fat) was removed from the CDS in this example prior to introduction into the pulse combustion dryer 30. The pulse combustion dryer 30 is a Model P0.1 manufactured by Pulse Combustion Systems, Inc. of Payson, Ariz. The pulse combustion dryer settings are given in Table 5.

TABLE 5

Pulse Combustion Dryer Settings - Example 2

| | | |
|---|---|---|
| Heat Release | 84,000 | BTU/hr |
| Turbo Air | 80.0 | psi |
| Exhaust Air | 60% | |
| Combustion Air | 60% | |
| Quench Air | 40% | |
| Transportation Air | 5% | |
| Rotary Valve | 85% | |
| Feed Pump Speed | 5% | |
| Combustion air pressure | 1.44 | |
| Contact Temperature | 1078° | F. |
| Exit Temperature | 180° | F. |
| Percentage of solids in feed | 28.5% | |
| Run time | 1.0 | hour |

A sample, termed Sample 2, of DDS produced under the operating conditions given in Table 1 was analyzed. The results of the analysis are presented in Table 6 and Table 7.

A gross analysis of Sample 2 is presented in Table 6. The mineral analysis was performed using a wet digest procedure, and the water content was determined by heating the sample for 3 hours at 105° C. Oil and protein (amino acids) were present in Sample 2. Oil analysis was performed using a solvent extraction procedure.

TABLE 6

Sample Analysis DDS

| Component | Sample 2 | |
|---|---|---|
| Water Content | 6.36 | — |
| Dry Matter (%) | 93.64 | — |
| Crude Protein (%) | 13.1 | 14.0 |
| Acid Hydrolysis Fat (%) | 11.0 | 12.0 |
| Crude Fiber (%) | 0.30 | 0.32 |
| Ash (%) | 15.9 | 17.0 |
| Sulfur (%) | 1.06 | 1.13 |
| Phosphorous (%) | 1.96 | 2.10 |
| Calcium (%) | 0.21 | 0.22 |

The protein portion of Sample 2 was broken down into constituent amino acids, and the resulting amino acid panels for Sample 2 obtained using high pressure liquid chromatography with post-column derivatization. The amino acid panel for Sample 2 is presented in Table 7. The detection limit for the amino acids in this example is about 0.01%.

TABLE 7

Sample Analysis DDS

| Component | Sample 2 |
|---|---|
| Alanine (%) | 0.91 |
| Arginine (%) | 0.81 |
| Aspartic acid (%) | 0.90 |
| Cystine (%) | 0.38 |
| Glutamic acid (%) | 2.13 |
| Glycine (%) | 0.69 |
| Histidine (%) | 0.35 |
| Isoleucine (%) | 0.28 |
| Leucine (%) | 0.72 |
| Total lysine (%) | 0.43 |
| Methionine (%) | 0.26 |
| Phenylalanine (%) | 0.45 |
| Proline (%) | 0.92 |
| Serine (%) | 0.57 |
| Threonine (%) | 0.48 |
| Tyrosine (%) | 0.35 |
| Tryptophan (%) | 0.05 |

Example 3

An analysis of another embodiment of DDS is presented in Table 8. This DDS was derived from an ethanol production facility 15 using a corn feedstock and a dry mill process. An analysis of the DDS, termed Sample 3, is given in Table 8. The mineral analysis in Table 8 was performed by inductively coupled argon plasma spectrometer (ICAP) using a wet digest procedure. The moisture content was determined by heating the sample for 3 hours at 105° C. Oil analysis was performed using an acid hydrolysis procedure.

TABLE 8

| | Component As Sent | Dry Wt. |
|---|---|---|
| Moisture Distillers Grains (%) | 7.95 | * |
| Dry Matter (%) | 92.05 | * |
| Crude Protein (%) | 19.1 | 20.7 |
| Acid Hydrolysis Fat (%) | 11.0 | 12.0 |
| Crude Fiber (%) | <.2 | <.2 |
| Ash (%) | 10.8 | 11.7 |
| Sulfur (%) | 1.59 | 1.72 |
| Phosphorus (%) | 2.06 | 2.24 |
| Calcium (%) | 0.16 | 0.16 |

Note that Sample 3 is about 21% protein and about 12% oil (dry weight). Samples 1 and Sample 2 are about 22% and 14 % protein, respectively, and the oil contents of Sample 1 and Sample 2 are about 5% and 4% respectively. The oil contents of Samples 1 and 2 may have been underestimated by the analytical methodology employed. The oil content and the protein content may make CDS difficult to dry in order to form DDS without oxidizing the oils and/or denaturing the proteins. Samples 1, 2, and 3 appear to indicate that protein has generally survived the drying of the CDS into DDS. Similarly, Sample 3 may indicate that oil present in the CDS has generally survived the drying of the CDS into DDS.

The foregoing discussion discloses and describes merely exemplary embodiments. Upon review of the specification, one of ordinary skill in the art will readily recognize from such discussion, and from the accompanying figures and claims, that various changes, modifications and variations can be made therein without departing from the spirit and scope of the invention as defined in the following claims.

What is claimed is:

1. A method for producing DDS, comprising:

introducing CDS into a drying gas stream having a maximum velocity of at least 60 meters per second; and recovering the DDS from the drying gas stream.

2. The method of claim 1, wherein the gas stream has a maximum velocity between about 60 meters per second and about 260 meters per second.

3. The method of claim 1, wherein the gas stream is a pulsed gas stream.

4. The method of claim 3, wherein the CDS is introduced into a portion of the gas stream having a temperature between about 600° F. and about 1800° F.

5. The method of claim 3, wherein a second temperature of the gas stream ranges from about 120° F. and about 200° F.

6. The method of claim 3, wherein a second temperature of the gas stream ranges from about 130° F. and about 150° F.

7. The method of claim 3, wherein the CDS is atomized in the gas stream by air atomization.

8. The method of claim 3, wherein a CDS particle is dried to DDS in about 0.5 seconds or less.

9. The method of claim 1, wherein the CDS comprises about 14 to about 40% solids.

10. The method of claim 1, wherein the CDS is dried in a continuous process.

* * * * *